United States Patent [19]

Ständer

[11] 3,737,799

[45] June 5, 1973

[54] CIRCUIT ARRANGEMENT FOR ATTENUATING A BROADBAND BACKGROUND NOISE LEVEL AND INTERFERING SIGNALS SUPERIMPOSED THEREUPON

[75] Inventor: Jürgen Ständer, D-28 Bremen, Germany

[73] Assignee: Fried Krupp Gesellschaft mit beschrankter Haftung, Essen, Germany

[22] Filed: Dec. 2, 1971

[21] Appl. No.: 204,248

[30] Foreign Application Priority Data

Dec. 3, 1970 Germany....................P 20 59 507.7

[52] U.S. Cl. ..................330/126, 325/475, 325/477, 330/149

[51] Int. Cl. ................................................H03f 3/68

[58] Field of Search..............................330/126, 149; 328/167; 325/475–477

[56] References Cited

UNITED STATES PATENTS

| | | | |
|---|---|---|---|
| 2,793,246 | 5/1957 | Olive et al. | 330/126 X |
| 3,665,321 | 5/1972 | Michnik et al. | 328/167 X |

*Primary Examiner*—Roy Lake
*Assistant Examiner*—James B. Mullins
*Attorney*—George H. Spencer, Harvey Kaye and Jay M. Finkelstein

[57] ABSTRACT

A circuit for attenuating broadband background noise signals and narrower band interfering signals for facilitating detection of simultaneously appearing useful signals having a shorter duration than the interfering signals, the circuit including two channels for respectively attenuating signals in the narrower band and outside the narrower band but with a broader band, with an operational amplifier connected in at least one channel and controlled to have a constant output with respect to signals of longer duration than the useful signals, the amplifier output providing the desired circuit output signal.

4 Claims, 5 Drawing Figures

Patented June 5, 1973 3,737,799

4 Sheets-Sheet 3

CIRCUIT ARRANGEMENT FOR ATTENUATING A BROADBAND BACKGROUND NOISE LEVEL AND INTERFERING SIGNALS SUPERIMPOSED THEREUPON

BACKGROUND OF THE INVENTION

The present invention relates to a circuit arrangement for use in reflected beam sounding devices, and particularly an arrangement for attenuating a broadband background noise level and interfering signals superimposed thereupon within a limited frequency range with the use of a control amplifier and filters tuned to the frequency range.

One task in the reflected beam sounding art is the analysis of the relation between the observer and the object being observed, i.e., its distance and relative speed. It is known that information about relative movements can be obtained by a time proportional Doppler frequency evaluation.

Usually relative movements are displayed in rectangular coordinates on the screen of a cathode-ray tube, the distance of each object under observation with respect to the observer being indicated along the abscissa and its relative speed along the ordinate, as it is described in detail, for example in U.S. Pat. No. 3,474,401 issued to R.W. Leisterer on Oct. 21, 1969.

A significant interfering signal in the reflected beam ranging art is the reverberation which is produced in sonar systems by the vibration of water particles and by reflections at the borders of the transmission channel, mainly at the water-air and water-bottom interfaces. In shipboard radar systems similar interfering signals are produced under high sea conditions, by reflections, mostly by the waves near the ship. These interfering signals have no significant Doppler frequency components and thus produce a limited, bright, interfering display along the abscissa. A broadband lower background noise level, however, is also present and produces a weak brightening of the entire screen on which the useful signals having Doppler frequencies are being displayed and are easily discernible. Useful signals from stationary objects, however, are often overridden by the bright display of the interfering signals along the abscissa and can thus not be identified, or can be identified only with difficulty.

SUMMARY OF THE INVENTION

In order for the display of the relative movements of interest to be clearly distinguishable from the interfering signals which are also displayed, in spite of the known very limited brightness range of cathode-ray tubes, it is an object of the present invention to provide a circuit of the type discussed above which prevents spectral levels of the interfering signals from overriding a partial area of the screen corresponding to their frequency range.

In principle, this can be achieved according to the basic idea of the present invention, in that a circuit is provided with a common input for the background noise, the interfering signals and the useful signals, which are of shorter duration than the interfering signals, and the circuit is made frequency selective within given frequency limits and is composed of a combination of two processing channels, one for spectral levels within the frequency range and the other for the spectral levels outside of the frequency range. At least one control amplifier is employed whose control time constant is high compared to the duration of the useful signals but low compared to the duration of the interfering signals. The useful signals, including those which lie within the frequency range of the interfering signals, are tappped at the output of the circuit and are superimposed on a noise background of given constant spectral levels.

The displays of objects under observation on the screen at any desired point with any desired relative speed, i.e., even in the vicinity of the abscissa, are then clearly distinguishable from this weak and uniform brightening of the entire screen.

Such a circuit can be arranged, according to the present invention, to cause an input signal composed of useful signals, interfering signals and broadband background noise, to be separated according to frequency within the frequency limits by a bandpass filter and, parallel thereto, a band-rejection filter, the bandpass filter and the band-rejection filter both being tuned to the frequency range of the interfering signals so that only the interfering signals, the background noise and the useful signals in this frequency range are fed from the output of the bandpass filter to a control amplifier supplied with a permanently set reference voltage. This control amplifier is connected to a further bandpass filter which is tuned to the same center frequency as the first bandpass filter but which has a narrower passband. The output signal from the further bandpass filter determines the gain of the control amplifier.

At the output of the band-rejection filter, however, in the second parallel processing channel, lie only useful signals and the background noise outside of the frequency range of the interfering signals. These useful signals and noise are fed to a second control amplifier with a permanently set reference voltage in order to smooth the background noise level. The gain of this second control amplifier is determined by an output signal from a further connected bandpass filter. The center frequency of this latter bandpass filter and its narrowest passband lie outside of the frequency range of the interfering signals but within the frequency limits of the circuit.

The control time constant of both control amplifiers are selected to be high compared to the duration of the useful signals but low compared to the duration of the interfering signals so that, subsequent to the frequency separation, uniformly sized constant spectral levels are present at their outputs, i.e., the smoothed interfering signals and the smoothed background noise, on which are superimposed short-duration useful signals as determined by the frequency separation. The output voltages of the control amplifiers are subsequently added in an adder stage at whose output there appears a signal which has constant spectral levels within the frequency limits of the circuit and which includes noise background on which the short-duration useful signals are superimposed.

Thus in this circuit arrangement of the present invention, an input signal is separated according to frequency in two parallel processing channels by means of a bandpass filter and a band-rejection filter both tuned to the same center frequency and both having as their bandwidth the frequency range of the interfering signals. However, with different phase shifts at the limits of the frequency range, distinct attenuation peaks may develop in such a circuit. A short useful signal whose spectral level lies in the vicnity of the frequency range then appears only in a strongly attenuated form at the output of the adder stage.

It is therefore a further object of the present invention to provide a circuit which assures that spectral levels of the useful signals within the frequency limits of interest, and also within the frequency range of the interfering signals, always appear at the output without attenuation whereas interfering signals of a limited duration which have a longer duration than the useful signals themselves and which lie within a frequency range inside the frequency limits of interest are smoothed and form, together with the smoothed background noise level, a constant spectral noise background of a given level for the useful signal.

This further object of the present invention is achieved by an arrangement including a control circuit with a level reference member, with a permanently set comparison level as the output value of the processing channel for spectral levels outside of the frequency range, a band-rejection filter with electrically controllable attenuation for the selected frequency range being connected thereto. The input signal at the input of the controlled band-rejection filter consists of the useful signals, the interfering signals and the background noise while its output is connected to the level reference member, via a control amplifier with a subsequently connected bandpass filter which is tuned to the frequency range. The bandpass filter output serves as the output of the processing channel for spectral levels within the frequency range. The useful signals are tapped, together with their noise background, at the output of the control amplifier which constitutes the output of the circuit.

In this control circuit according to the invention only one processing channel for the input signal is completely provided whereas the output signal of that processing channel which smoothes the noise background in the above-described circuit is replaced by the permanently settable comparison level in the level reference member. This level corresponds to a low value of the spectral level of the background noise at the extremes of the frequency limits of interest. The output signal of the level reference member controls the attenuation of the band-rejection filter in the frequency range of the interfering signals.

The input signal to be processed always has a background noise level, e.g. in the form of white noise, on which are superimposed useful signals at different frequencies within the entire range between the frequency limits as well as longer-duration interfering signals in their own narrow frequency range within these frequency limits.

During these times when the input signal only has a uniform white noise with spectral levels within the frequency range of the interfering signals at the same height as the comparison level, the attenuation of the band rejection filter has no effect. When an interfering signal arrives it will first pass through the band rejection filter without attenuation and then through the subsequently connected control amplifier, to which is connected a bandpass filter tuned to the frequency range of the interfering signals. The output signal of the bandpass filter which contains the interfering signal and the noise in the frequency range of the interfering signal acts on the level reference member to effect a comparison with the permanently set comparison level. The output voltage of the level reference member, which is thus determined by the interfering signal, serves as tbe control voltage for the attenuation of the band-rejection filter which now acts to provide attenuation in the frequency range of the interfering signals.

The control signal response times of the control amplifier are selected to be short compared to the duration of the interfering signals but long compared to the duration of the relatively short useful signals. While the interfering signals are present the amplification of the control amplifier is varied by its output signal and the attenuation of the band-rejection filter is varied by the control voltage from the output of the level reference member, so that the output voltage of the control amplifier exhibits constant spectral levels within the total region between the frequency limits, which levels correspond to the low comparison level and form the noise background. A display of this signal on the screen of a cathode-ray tube, with linear time deflection, effects a uniform weak brightening of the screen.

A useful signal of short duration which arrives after the interfering signal and which is superimposed on the background noise level is able to pass the band-rejection filter although it lies within the frequency range of the interfering signals because its attenuation is not effected sufficiently rapidly due to the short duration of the useful signal compared to the control time constant of the control amplifier. This useful signal appears, when considered with respect to the noise background, at the output of the control amplifier without attenuation. In a reflected beam ranging process this useful signal represents perhaps an object which is stationary compared to the observer, the time interval between transmitting and receiving the useful signal corresponding to the distance between observer and object. The display then takes the form of a dot on the abscissa of the screen.

Useful signals whose frequencies lie at the boundaries of the frequency range of the interfering signals, and thus along the limits of the rejection range of the band-rejection filter, appear at the output of the control circuit without attenuation so that the drawbacks, particularly the attenuation peaks, of the first above-mentioned circuit are avoided. Useful signals in the frequency range of the interfering signals which appear simultaneously with the interfering signals and whose spectral levels are greater than those of the interfering signals are also displayed with reference to the constant noise background since they are always shorter than the interfering signals and thus shorter than the control time constant of the control amplifier. The useful signals in this case are reduced only by the momentary attenuation of the band-rejection filter. In the example of reflected beam ranging, this corresponds to an object which is stationary with respect to the observer and which is located in the immediate vicinity of the observer so that the useful signal is received together with the interfering signal, its spectral levels then being, of course, higher than those of the interfering signal. Since the respective attenuation of the band-rejection filter is set, however, according to the lower spectral levels of the interfering signal, the useful signal is reduced only insignificantly and is displayed in a clearly discernible manner.

Short useful signals which lie outside of the frequency range of the interfering signals to which the band-rejection filter is tuned but within tbe frequency limits of the system of course always appear unattenu- FIG. 2 is a block circuit diagram of a circuit SI with frequency separation of the input signal applied to input line 1 in two processing channels 71 and 72 by means of a bandpass filter 711 and a band-rejection filter 721. The bandpass filter 711 and the band-rejection filter 721 are tuned to the same frequency range 5 having the transmitting frequency *f0* as the center frequency.

In the processing channel 71 only signal components in this frequency range 5 are fed to a control amplifier 712 whose signal input is connected to the output of bandpass filter 711. A second, narrow band bandpass filter 713 is connected to the output of control amplifier 712 and is tuned to the same center frequency f0 as the bandpass filter 711. The output signal of the second bandpass filter 713 is delivered to the control input of control amplifier 712 to set the gain of the control amplifier in such a manner that it produces an output voltage which is constant over frequency range 5 and which corresponds to its set reference voltage.

The control time constant of control amplifier 712 is selected to be long enough that only the interfering signals 4 which have a longer duration than the useful signals N1 . . . N3 influence the control amplifier. Useful signals N1 in this frequency range which have a short duration appear at the output of the control amplifier 712 without amplification change if they do not coincide in time with the interfering signals 4. Spectral levels, or amplitudes, of useful signals N1 in this frequency range 5 which appear together with lower spectral levels, or amplitudes, of interfering signals 4, are amplified by the control amplifier 712 with the momentary amplification established to smooth the lower spectral levels of the interfering signals, and the useful signals appear at the output since they are of only short duration compared to the amplification varying times of the control amplifier 712, the useful signals being superimposed on the constant output which the amplifier is adjusted to produce.

In the second parallel processing channel 72, the input signal at line 1 which is in frequency range 5 is suppressed by the band-rejection filter 721 so that at its output no interfering signals 4 appear, there only appearing the background noise level 2 for all frequency components within frequency region 3, except for those in frequency range 5, and any other occurring short-duration useful signals N2, N3, etc. outside of the frequency range 5. The signal at the output of the band-rejection filter 721 is fed to a second control amplifier 722 whose output is connected to a further bandpass filter 723 which corresponds to the second bandpass filter 713 in the first processing channel 71. The pass band and center frequency of filter 723 lie outside of the limits of the frequency range 5 but within frequency limits of region 3.

The narrow band component of the background noise level 2 which is passed by the bandpass filter 723 acts on the second control amplifier 722 so that at its output the background noise level appears, in accordance with the set reference voltage, in a smoothed manner with constant spectral amplitude levels within the frequency limits of region 3, excluding frequency range 5. This noise level, which has the same magnitude as that at the output of the first control amplifier 712, has superimposed thereon short-duration useful signals N2, N3 outside of frequency range 5. Because of their short duration, these useful signals N do not influence the amplification factor of control amplifier 722 and are amplified at the then existing amplification factor of the amplifier.

The outputs of the control amplifiers 712 and 722 of both processing channels 71 and 72 are connected to an adder stage 73 which furnishes at its output constant spectral levels as the noise background, constituted by smoother, or leveled, interfering signals 4 and background noise level 2, and superimposed useful signals N1, N2, N3, etc. from the entire frequency region 3. The level of the noise background is determined by the same reference voltages in the control amplifiers of both processing channels 71 and 72 and is based on the requirements of the existing conditions.

One drawback of this circuit SI, however, is that the useful signals N which lie at the edges of frequency range 5 can appear at the output of the adder stage 73 only with strong attenuation due to the use of filters of a type which effect different phase shifts.

The control circuit SII shown as a block circuit diagram in FIG. 3 eliminates this drawback since it has filters in only one processing channel.

This control circuit SII includes a variable attenuation band-rejection filter 81 whose attenuation level is set by the output signal of a level reference member 9, this signal being delivered to a control input of filter 81 via a line 82. The circuit also includes a control amplifier 10 whose input is connected to the output of filter 81 and whose output, at line 11, presents constant output voltage when there is being received an input voltage of longer time duration than the useful signals N, and a bandpass filter 12 connected to the output of amplifier 10 and having a pass band which corresponds to frequency range 5. The output voltage level of filter 12 appears on line 13 and is compared in the level reference member 9, possibly after rectification, with a permanently settable comparison voltage level delivered from a potentiometer via line 14. The permanently settable comparison level is selected to coincide with the level of the low background noise 2 normally present, in the case when this control circuit is employed, outside frequency range 5 and at the borders of frequency region 3.

The output signal of processing channel 72 of circuit SI of FIG. 2 for smoothing the background noise level outside of frequency range 5 is here replaced by the permanently settable comparison level appearing on line 14. The output level on line 13 corresponds to that of processing channel 71 of circuit SI for frequency range 5, each in the steady-state condition of the circuit arrangement.

The above-mentioned components of this control circuit SII, except for band-rejection filter 81, can be realized by any known basic circuits in the electrical art and are not, per se, part of the present invention.

The control voltage on line 82 for an input signal on line 1 which has only a background noise level 2 corresponding to its amplitude in frequency range 5 to the comparison level 14 has such a value that the input signal from line 1 still passes the band-rejection filter 81, whose attenuation is controllable, without attenuation. If, now, the input signal has an interfering signal 4 superimposed on this background noise level 2, this signal initially also passes the band-rejection filter 81 and the control amplifier 10 without attenuation. The subsequently connected bandpass filter 12 permits interfering signal 4 and background noise level 2 in frequency ated and superimposed on the constant noise background at the output of the control amplifier, even when they appear simultaneously with the interfering signals. Their display on the screen indicates the relative speed and distance of the object with respect to the observer at values of relative speeds which do not lie on the abscissa but have ordinate values according to their Doppler frequency components.

A particular advantage of the control circuit according to the present invention is thus that short useful signals within the total region between the frequency limits, i.e., also at the limits of the frequency range of the interfering signals, in contradistinction to the first-mentioned circuit, always appear at the output without attenuation, whereas interfering signals having a longer duration, as well as the background noise level which can always be present, are regulated to given constant spectral levels which are determined by a reference voltage in the control amplifier. Thus only useful signals appear at the output of the control circuit which are superimposed on the given constant spectral levels representing the noise background.

For reflected beam ranging it is thus always assured that, over a period of time, the frequency contents of the output voltage of the control amplifier are always displayed on the screen of a cathode-ray tube with the desired uniform weak brightening of the screen due to the constant spectral levels of the interfering signals and of the background noise level, as the noise background, the useful signals thus being clearly distinguishable. The frequency limits of the reflected beam sounding system determine the limits of the relative speeds of observed objects with respect to the observer which can be compiled.

DESCRIPTION OF THE PREFERRED EMBODIMENTS

Figure 1:
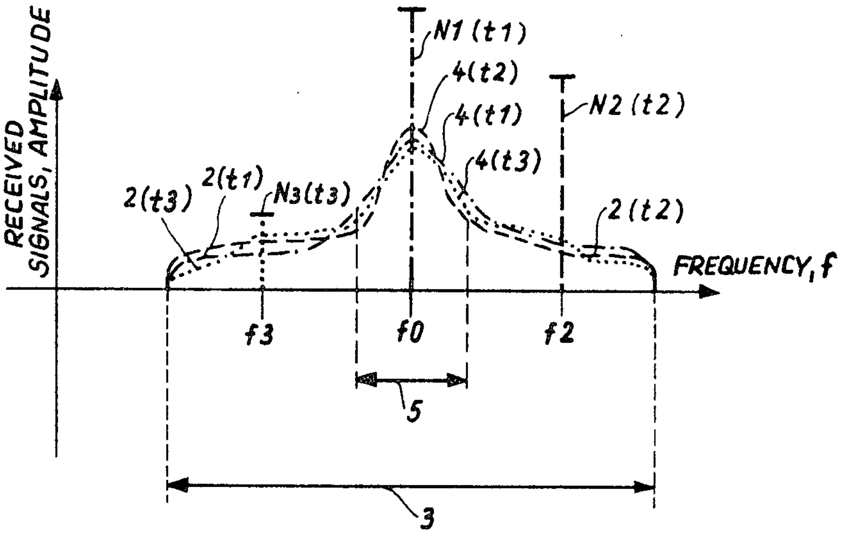
FIG. 1 is a basic illustration of the spectral levels with respect to frequency of received signals of a reflected beam ranging system.

FIG. 1 is a basic illustration of the frequency distribution of spectral levels of input signals which may constitute signals received by a reflected beam ranging system at different times, *t*1, *t*2, *t*3. The signals received at time *t*1 are shown by dot-dash lines, at time *t*2 by broken lines, and at time *t*3 by dotted lines. A background noise level 2 in the form of white noise within the region 3 between the frequency limits determined by the parameters of the ranging system, has superimposed on it spectral levels of interferring signals 4 within a frequency range 5 which is smaller than, and within, region 3. These interfering signals are produced, for example, by reverberation in sonar systems, or by reflection from waves under high sea conditions in shipboard radar systems. Within the total frequency region 3, there can appear spectral levels of useful signals N1, N2, N3, etc., produced by reflection from objects which are either stationary or moving relative to the observer. The term "spectral level" here means the amplitude of a signal at a discrete frequency within the frequency region 3.

The spectral level of the useful signal N1 at a frequency *f*0, which is the transmitting frequency, is produced by an object which is stationary with respect to the observer and thus this signal contains no Doppler frequency components. The spectral level of useful signal N2 at a frequency *f*2, which is higher than the transmitting frequency *f*0, is due to an observed object which is moving toward the observer at a relative speed which determines its Doppler frequency component *f*2 − *f*0. The spectral level of the useful signal N3 results from an object which is moving away from the observer at a relative speed which determines its Doppler frequency component *f*0 − *f*3, since signal N3 is at a frequency *f*3 which is lower than the tranwmitting frequency *f*0.

Figure 1A:
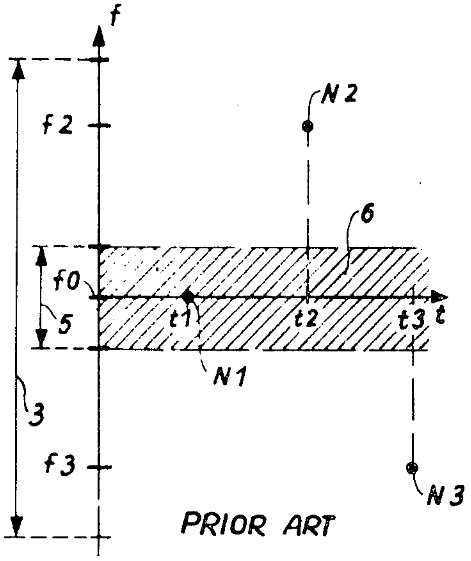
FIG. 1*a* is a Doppler frequency representation of the received signals of FIG. 1 on a screen of a cathode-ray tube with a time-proportionally deflected electron beam associated with a circuit according to the state of the art.

FIG. 1a shows the representation of the Doppler frequency components of such input signals at the various reception times *t* on the screen of a cathode-ray tube producing an electron beam which is deflected along the abscissa in synchronism with the transmitted signal and at a rate proportional to the time interval during which the reflected signals are to be observed. The frequency spectrum levels of the background noise level 2 within frequency region 3 generally produce a weak brightening of the screen. Interferring signals 4, however, effect, in an unfavorable manner, a limited, strong brightening over the area 6 of the cathode-ray tube screen centered about the horizontal axis of the display. The frequency spectrum levels of the useful signals N1, N2, N3, etc., are represented by luminous dots whose vertical position, or ordinate value, represents the frequency location of those spectrum levels.

Thus, this display indicates the relative speeds of observed objects, based on their Doppler frequency components, and their distance from the observer, based on the time t between transmission and reception. The strong brightening over area 6, which corresponds to frequency range 5, however annoyingly overrides useful signals in this range, such as, for example, the illustrated useful signal N1.

Figure 1B:
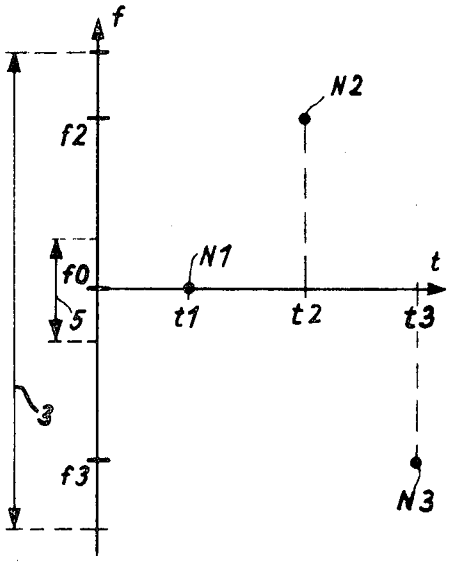
FIG. 1*b* is a simlar Doppler frequency representation on the screen of the cathode-ray tube of apparatus employing a circuit arrangement according to the present invention.
Figure 2:
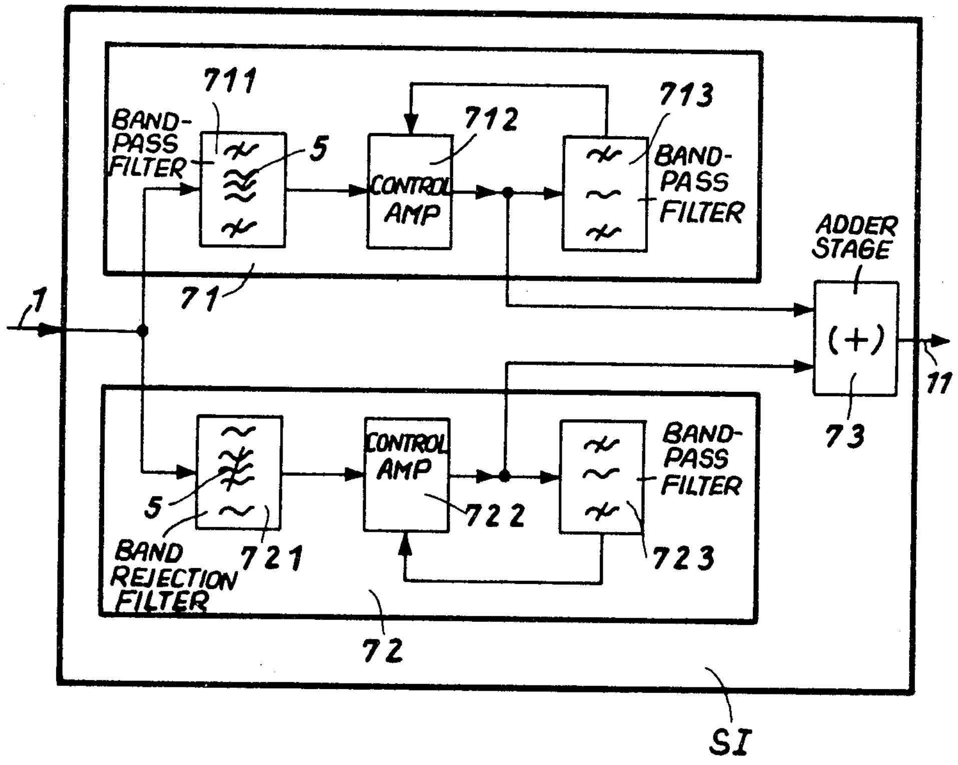
FIG. 2 is a block circuit diagram of a circuit arrangement according to the present invention with two parallel processing channels.
Figure 3:
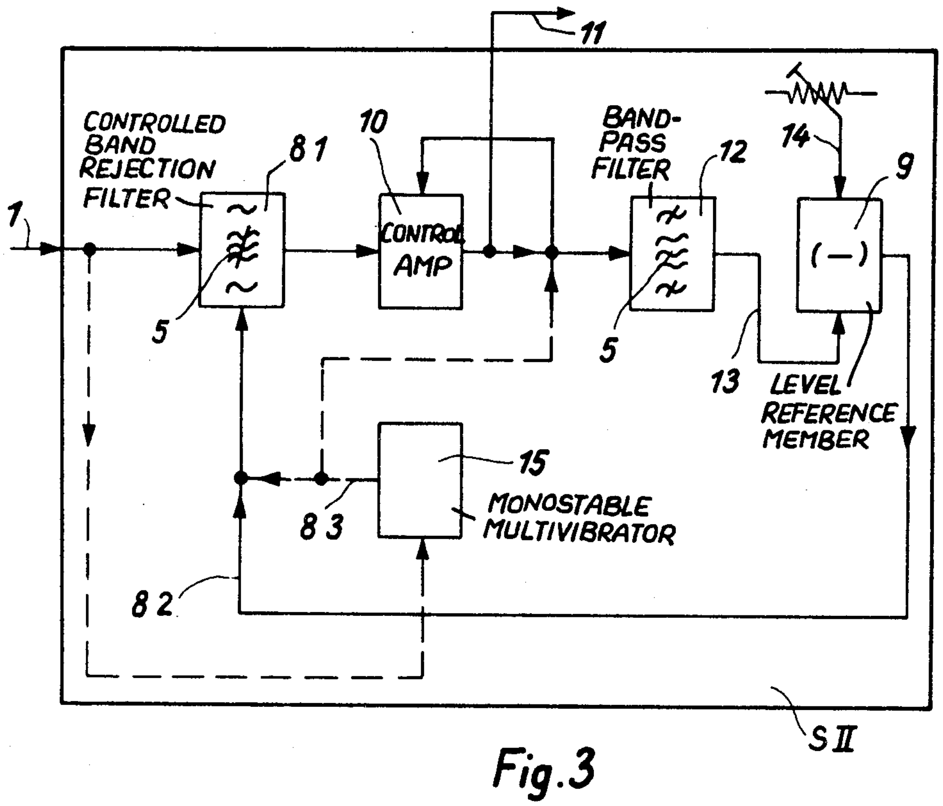
FIG. 3 is a block circuit diagram of a further circuit arrangement according to the present invention.

When the circuit arrangements according to the present invention and shown in FIGS. 2 and 3 are used, the spectral levels of the interferring signals 4 are attenuated, or smoothed, within frequency range 5 and the background level is smoothed within frequency region 3 to a constant low background noise value so that the useful signals N are clearly distinguishable upon a screen which is altogether uniformly and weakly brightened. FIG. 1*b* depicts the visual impression produced thereby, when compared with the conditions of FIG. 1a which correspond to the state of the art.

range 5 to pass, so that the level of its output on line 13 is thus higher than the comparison level on line 14, and member 9 then produces a control voltage on line 82 such that the attenuation of the controllable band-rejection filter 81 is increased with respect to frequencies in range 5. At the output of the band-rejection 81 the interfering signal 4 is thus attenuated and is fed to control amplifier 10.

The attenuation of the band-rejection filter 81 is thus corrected by the control voltage on line 82 and the gain of control amplifier 10 is varied so that the output voltage on line 11 has constant spectral levels within frequency regions 3, i.e. the uniform noise background whose value is given by a set reference voltage in control amplifier 10. When the levels of the interfering signal 4 become lower, the control voltage on line 82 also changes and thus so does the attenuation of the band-rejection filter 81. This regulation has a certain control time constant which is substantially determined by the time behavior of the control amplifier 10 and is so selected that longer-duration interfering signals 4 are controlled and thus smoothed, whereas shorter-duration useful signals N1, N2, N3, etc. which are superimposed on noise background level 2, do not influence the circuit control voltages because these useful signals end before the entire control circuit SII can respond thereto to reach a new steady state.

Useful signals N1, N2, N3, etc. thus appear, without being suppressed or smoothed, at the output of the control amplifier 10 superimposed on the constant spectral levels, the latter representing the noise background, and the useful signals are only insignificantly attenuated by momentary interfering signals, this occurring only when the high spectral levels of the useful signals N1 in frequency range 5 appear simultaneously with comparatively much lower levels of the interfering signals 4.

It is advisable, when using the control circuit SII for reflected beam ranging, to attenuate a strong interfering signal 4, which is present immediately at the beginning of each reflected beam ranging period, in band-rejection filter 81 for a short period in order to avoid the appearance of a trace at the range zero point on the screen in the first instant. This can be done by applying a pulse whose duration is short compared to the duration of interfering signals 4.

In the circuit of FIG. 3 this pulse is produced by a monostable multivibrator 15 which is started with the beginning of the transmission and whose output is applied via line 83 to fully switch on the attenuation of band-rejection filter 81. Device 15 can be triggered by the first interfering signal return or by feed through from the apparatus transmitter. The output from device 15 is also delivered to the output of control amplifier 10 to reduce its gain, or amplification factor.

Ater termination of this pulse on line 83, the attenuation of the band-rejection filter 81 again becomes ineffective and the control circuit SII reaches its steady state since interfering signals 4 in the frequency range 5 pass through the control amplifier 10 and bandpass filter 12 to the level reference member 9 and there produce a control voltage on line 82 which sets the appropriate attenuation of the band-rejection filter 81. Spectral levels of the interfering signals 4 also momentarily reach the output of the control amplifier 10 during this time of buildup and are displayed on the screen. However, they produce only a weak brightening of the screen in the vicinity of the abscissa which does not override useful signals N and which can be identified as interference.

Figure 4:
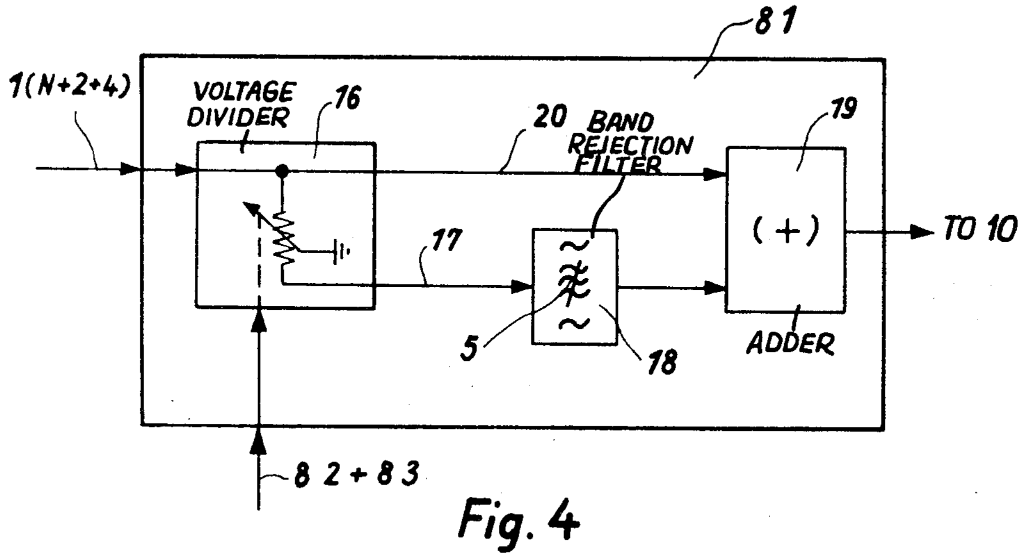
FIG. 4 is a block circuit diagram of an embodiment of a band-rejection filter whose attenuation is electrically controllable in the control circuit of FIG. 3.

A particularly advantageous embodiment of the present invention for the band-rejection filter 81 with controllable attenuation is shown in FIG. 4. It includes a voltage divider 16 receiving the input signal on line 1 and having a dividing ratio determined by the control voltage on line 82 and possibly by the pulse on line 83. A portion of the input signal, determined by the dividing ratio is fed via line 17 to a band-rejection filter 18 which blocks frequency range 5 and whose output is connected to an adder member 19. The remaining input signal portion is connected directly via line 20 to a second input of this adder member 19. The output of the adder member 19 is connected to the input of control amplifier 10.

If the input signal on line 1 consists only of a constant background noise level 2 which corresponds to the set comparison level voltage on line 14, the entire input signal appears on line 20. With an increasing proportion of interfering signals 4, the input signal portion on line 17 increases due to the control voltage on line 82 and the input signal portion on line 20 decreases by the same amount. Filter 18, which is designed according to known filter theory, attenuates with a constant attenuation level the input signal portion on line 17 in frequency range 5.

Outside of frequency range 5 the sum of the input signal portions on lines 17 and 20 at the output of the adder member 19 is again equal to the input signal on line 1 at the input of the voltage divider 16. Only in frequency range 5 is the output signal of the adder member 19 dependent on the dividing ratio set into divider 16 since the input signal portion on line 17, whose size depends on the value of control voltage 82, passes through filter 18 where the components in frequency range 5 are attenuated. Thus at the output of the adder member 19 the signal components in this frequency range are in this case decreased compared to the corresponding components of the input signal on line 1 and the magnitude of the decrease depends on the dividing ratio of divider 16.

In order to be able to make the correct addition in adder member 19, the phase shift of filter 18 must be kept small, which, as is known can be accomplished by the use of, for example, only a half section in filter 18, e.g., of a T-section filter which consists of only one series impedance and one shunt impedance. The series impedance may be a series connection of a series resistance and a parallel-resonant circuit, the shunt impedance a parallel connection of a series-resonant circuit and a resistance. For example the series resistance corresponds to the image impedance of the T-section filter in the pass band. The other resistance is smaller than the image impedance of the two half sections of the T-section filter.

Figure 5:
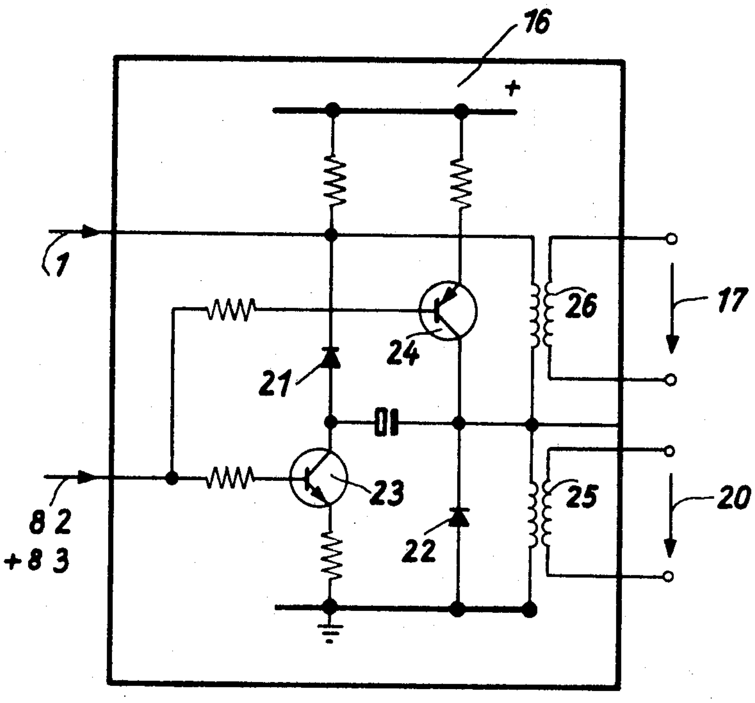
FIG. 5 is a circuit diagram of an embodiment of a controllable voltage divider for the band-rejection filter of FIG. 4.

The voltage divider 16 may be constructed, for example, as shown in FIG. 5. The input signal on line 1 is divided via two diodes 21 and 22 whose instantaneous differential resistances are varied in respectively opposite directions by the control voltage on line 82 and possibly also the pulse on line 83. This variation is effected by respectively opposite polarity transistors 23 and 24. The dividing ratio for the input signal on line 1 is thus determined by the control voltage on line 82 and possibly the pulse on line 83. The voltage across diode 22 corresponds to the input signal portion applied to line 20, and the voltage across diode 21 corresponds to the input signal portion on line 17. These portions are coupled out by transformers 25 and 26, respectively, and are individually fed to filter 18 and adder member 19, respectively.

The illustrated circuit devices employed in the circuit arrangements according to the present invention are within the scope of the present invention but can be replaced by other basic circuits which are known to the person skilled in the circuit art.

It will be understood that the above description of the present invention is susceptible to various modifications, changes and adaptations, and the same are intended to be comprehended within the meaning and range of equivalents of the appended claims.

I claim:

1. A circuit for attenuating broadband background noise signals in a frequency region between the circuit frequency limits and superimposed interfering signals in a limited frequency range within and narrower than the frequency region, in a system for detecting useful signals of shorter duration than the interfering signals, said circuit comprising, in combination;

means defining an input line connected to receive those background noise signals, interfering signals and useful signals lying within the frequency region;

means defining a first processing channel connected to said input line for selectively processing those signal components on said line which are within the limited frequency range;

means defining a second processing channel connected for influencing those signal components on said line which are outside of the limited frequency range and within the frequency region;

control amplifier means connected in both processing channels for amplifying the signals in the channels and connected to have its gain controlled in a manner to produce a constant output voltage level, the gain-adjusting control time constant of said amplifier means being long compared to the duration of the useful signals and short compared to the duration of the background noise and interfering signals so that useful signals do not substantially influence the gain of said amplifier; and output means connected to the signal output of said amplifier means for producing an output signal composed of the useful signals within the frequency region superimposed on a substantially constant amplitude background derived from the broadband background noise and the interfering signals.

2. An arrangement as defined in claim 1, wherein:

said channels are connected in parallel;

said control amplifier means includes a first control amplifier in said first channel and a second control amplifier in said second channel;

said first channel comprises a first bandpass filter connected between said input line and the signal input of said first amplifier and having a pass band corresponding to the limited frequency range, and a second bandpass filter connected between the signal output and control input of said first amplifier and having a pass band within, and narrower than, the limited frequency range;

said second channel comprises a band-rejection filter connected between said input means and the signal input of said second amplifier and having a stop band corresponding to the limited frequency range, and a third bandpass filter connected between the signal output and control input of said second amplifier and having a pass band outside of the limited frequency range but within the frequency region; and said output means comprise adder means having inputs connected to the signal outputs of said first and second amplifiers and an output at which the output signal appears.

3. A circuit for attenuating broadband background noise signals in a frequency region between the circuit frequency limits and superimposed interfering signals in a limited frequency range within and narrower than the frequency region, in a system for detecting useful signals of shorter duration than the interfering signals, said circuit comprising, in combination:

means defining an input line connected to receive those background noise signals, interfering signals and useful signals lying within the frequency region;

means defining a first processing channel connected to said input line for selectively processing those signal components on said line which are within the limited frequency range;

means defining a second processing channel connected for influencing those signal components on said line which are outside of the limited frequency range and within the frequency region;

a control amplifier connected to both of said processing channels for amplifying the signals in its associated channel and arranged to have its gain controlled in a manner to produce a constant output voltage level, the gain-adjusting control time constant of said amplifier being long compared to the duration of the useful signals and short compared to the duration of the interfering signals so that useful signals do not substantially influence the gain of said amplifier;

output means connected to the signal output of said amplifier for producing an output signal composed of the useful signals within the frequency region superimposed on a substantially constant amplitude background derived from the broadband background noise and the interfering signals;

a signal level reference member having a comparison signal input, a second signal input and an output at which appears a signal representing tbe amount by which a signal at said second signal input exceeds a signal at said comparison signal input;

said second channel includes comparison means connected to said comparison signal input and providing a comparison signal having a permanently settable level representing the anticipated level of the background noise signals outside the limited frequency range; and said first channel includes a controllable band-rejection filter having a stop band corresponding to the limited frequency range and having a control input, the stop band attenuation of said band-rejection filter being proportional to the value of the signal at its said control imput, said filter having its control input connected to said reference member output, its signal input connected to said input line, and its signal output connected to the signal input of said control amplifier, and a bandpass filter having a pass band corresponding to the limited frequency range and connected between said amplifier signal output and said reference member second signal input.

4. An arrangement as defined in claim 5 wherein said controllable band-rejection filter comprises:

a voltage divider having an input connected to said input line and two outputs and including means for varying the division of the signal at its input between its two outputs; a further band-rejection filter connected to one output of said divider and having a stop band corresponding to the limited frequency range; and an adder having one input connected to the other output of said divider, another input connected to the output of said further band-rejection filter, and an output at which appears a signal corresponding to the sum of the signals at its inputs.

* * * * *